Dec. 7, 1943.     T. J. WATSON     2,335,981
RECORD CONTROLLED MACHINE
Filed April 6, 1943     5 Sheets-Sheet 2

Dec. 7, 1943.   T. J. WATSON   2,335,981
RECORD CONTROLLED MACHINE
Filed April 6, 1943   5 Sheets-Sheet 3

INVENTOR
Thomas J. Watson
BY
ATTORNEY

Dec. 7, 1943.   T. J. WATSON   2,335,981
RECORD CONTROLLED MACHINE
Filed April 6, 1943   5 Sheets-Sheet 4

INVENTOR
Thomas J. Watson
BY
ATTORNEY

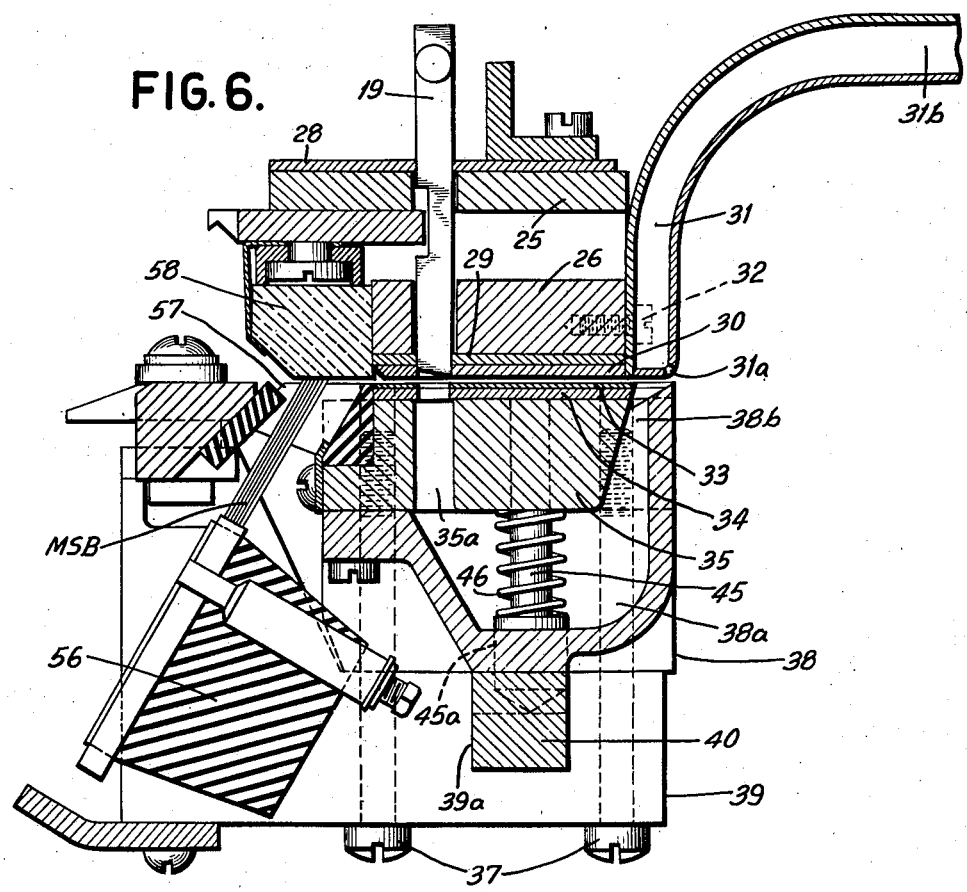

Patented Dec. 7, 1943

2,335,981

UNITED STATES PATENT OFFICE 2,335,981

RECORD CONTROLLED MACHINE

Thomas J. Watson, New Canaan, Conn., assignor to International Business Machines Corporation, New York, N. Y., a corporation of New York Application April 6, 1943, Serial No. 481,999

11 Claims. (Cl. 164—115)

This invention relates to record-controlled machines and more specifically to machines for perforating the accounting and statistical record cards used in such machines.

Record controlled accounting and statistical machines and subsidiary equipment thereto are quite commonly electrically controlled and operated and are equipped with electrical sensing brushes which traverse the record cards and control the operation of the machine in accordance with data designations in the cards. The data designations may take several forms, but the most common ones in use are either perforations or conductive marks differentially disposed in the columns of the record card in which the distances of the designations from one of the longer edges of the card determines the values or significance of the designations. The record sensing brushes usually control electro-magnets and relays, which, in turn, control the operation of the machine in various ways, such as to cause the accumulation and printing of numerical data, and the printing of alphabetical data.

In the case of records in which the designations or perforations are placed in the card columns, the record sensing brushes usually reach through the perforations and engage a contact to close a circuit through a relay or magnet which in some manner controls the operation of the machine. Where the designations are conductive marks placed on the surface of the card, there is usually provided a plurality of brushes for each card column which are electrically connected together when a conductive mark passes thereunder to close a circuit through the brushes to a control magnet or relay. In this last case, the conductive marks are usually made with some form of special pencil which places a heavy deposit of some electrically conductive material, like graphite, on the card. This material has a high electrical resistance and much of the success of the machine depends upon the reliability of the contact between the brushes and the conductive marks.

In both cases, the brushes traverse the card while it is moving through the machine, and, naturally, there is a certain amount of abrasion which causes the formation of balls of fuzz or the accumulation of lint on the brushes. This interferes with the electrical contacts between the brushes and the usual common contact in the first case, and the brushes and conductive marks in the other case. Also, through repeated use and storage, the cards may become soiled, dusty, and dirty and some of the dust and dirt may be transferred to the brushes with or without the accumulation of lint and thereby aggravate the problem of securing good contact of the brushes. In the case of records in which the designations are perforations, there is a certain amount of fibre or loose lint left clinging to the edges of the holes after the records are perforated, and some of this lint becomes detached by the brushes when the records are passed through a machine utilizing such perforations.

It is now proposed to remedy these difficulties by providing a system of nozzles which are coupled to a suitable vacuum pump or blower and disposed so as to remove the lint and dirt from the surface of the card and from the edges of the perforations before the card passes to the sensing brushes. By this means, it is proposed to prevent any dirt, dust, lint, and other loose particles that may be clinging to the card, or caught in the perforations from reading the brushes.

It is an object of the present invention, therefore, to provide a record controlled machine, such as a card perforating machine, with suitable means for cleaning the card prior to its analysis by the record sensing mechanism.

Other objects of the invention will be pointed out in the following description and claims and illustrated in the accompanying drawings, which disclose, by way of example, the principle of the invention and the best mode, which has been contemplated, of applying that principle.

In the drawings:

Fig. 6 is a large scale vertical section of the punches and die as viewed on the line 6—6 of Fig. 4.

Figure 1:
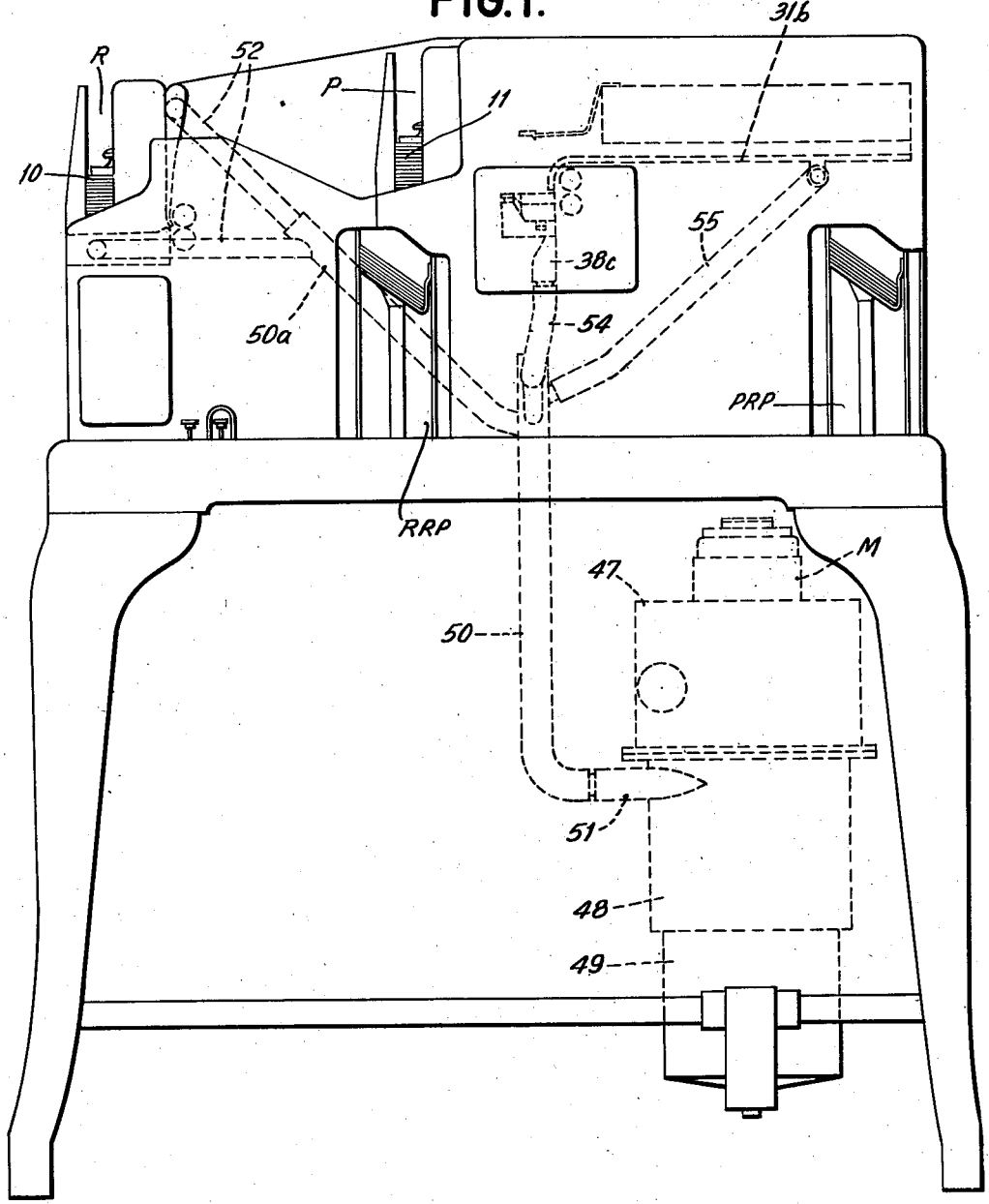
Fig. 1 is a front elevation of a machine incorporating the present invention.

In the drawings, the invention is shown applied to the well known "International" reproducing punch which is substantially the same as the machine described in Patent No. 2,032,805. Since this machine is now well known in the art, only a very brief general description will be given to the extent necessary to comprehend the present invention.

Figure 2:
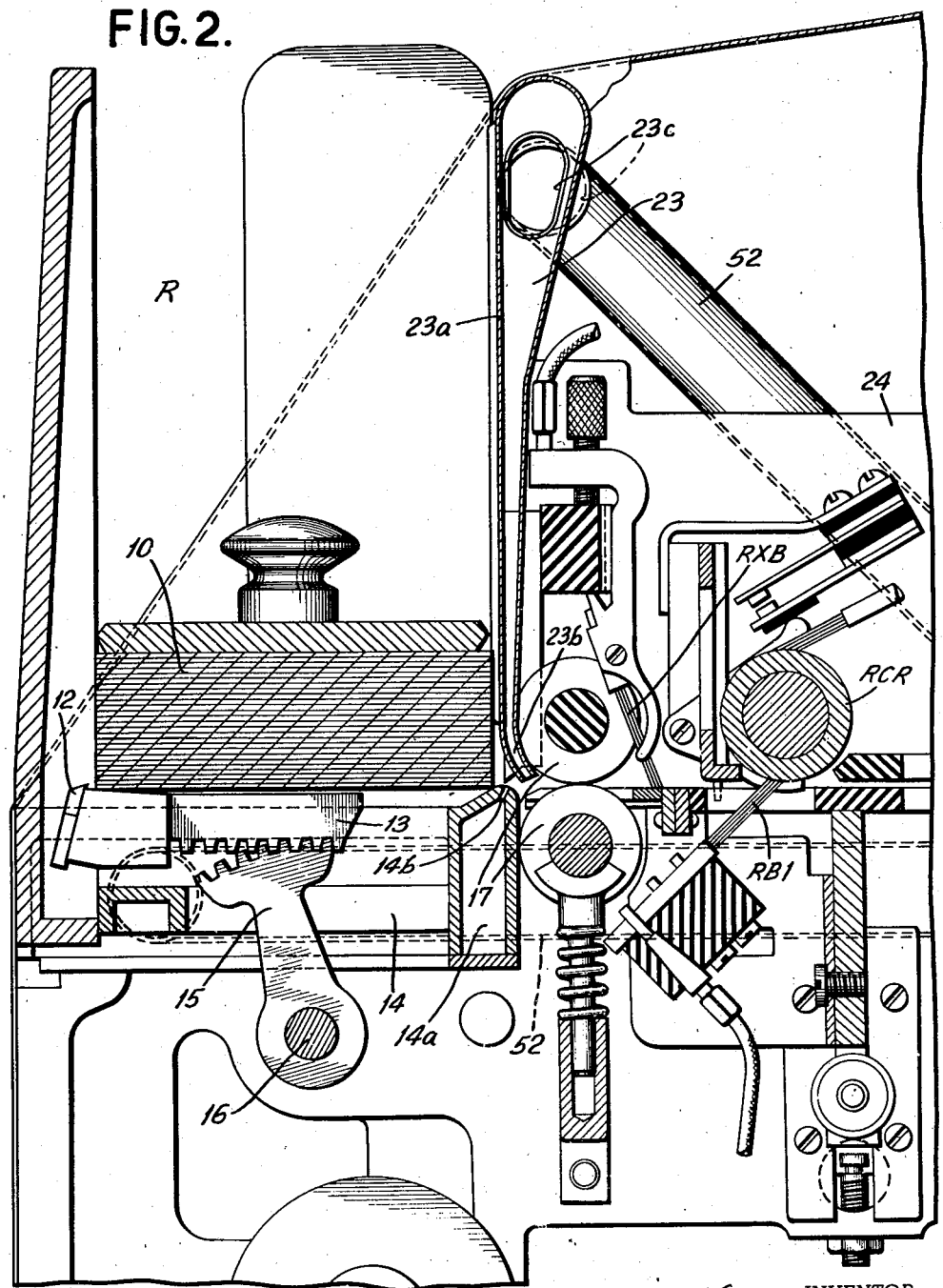
Fig. 2 is a large scale vertical section through one of the card feeding and sensing mechanisms.
Figure 3:
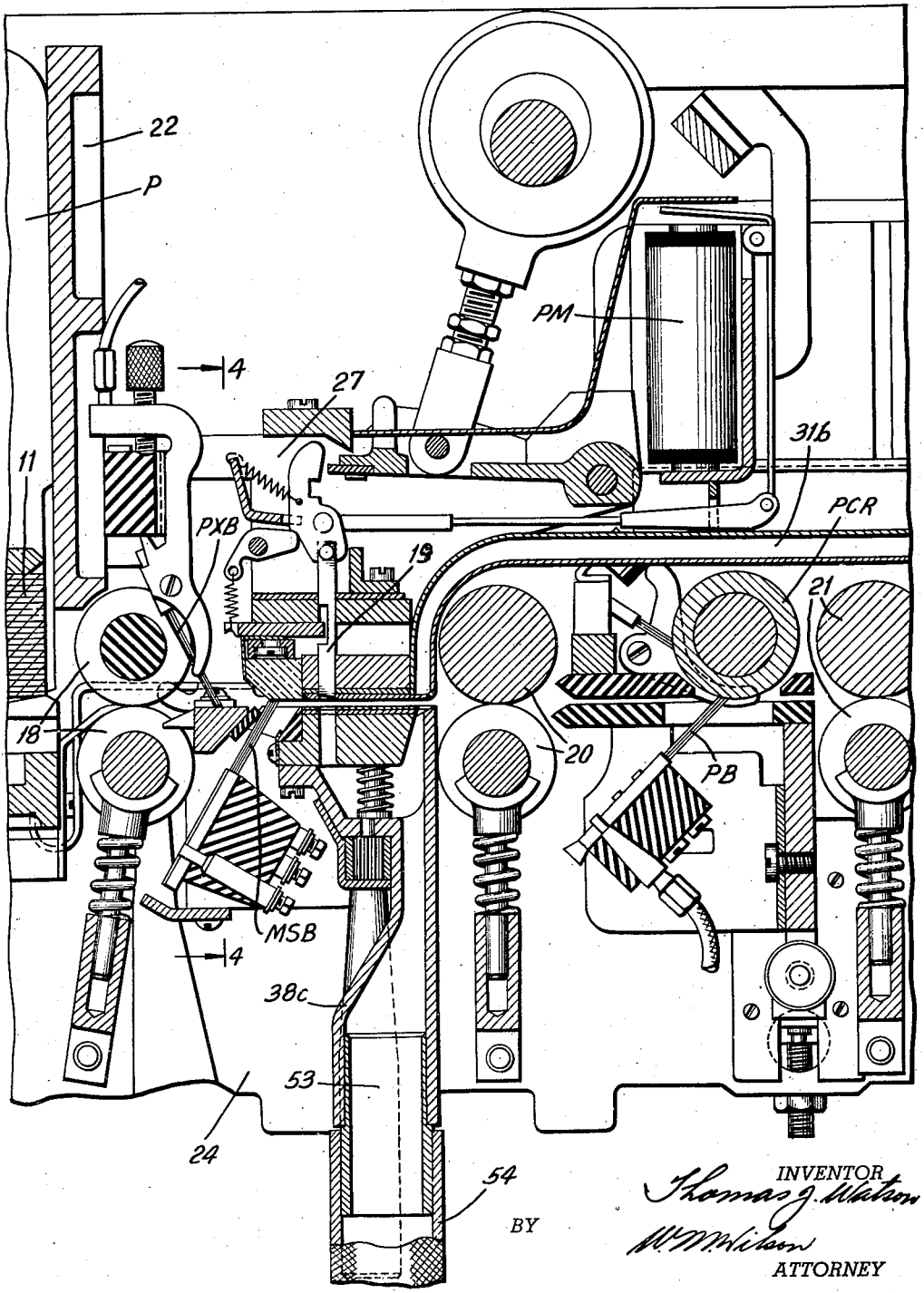
Fig. 3 is a large scale vertical section showing the card perforating mechanism and another of the record sensing mechanisms.

The machine is provided with two card hoppers or magazines designated R in Figs. 1 and 2 and P in Figs. 1 and 3, only a portion of the punch hopper P being shown in Fig. 3. The hopper R receives a stack of reproducing cards 10 which are to be wholly or partly duplicated by punching cards 11 from hopper P under control of suitable data designations in the cards 10. The hoppers R and P are practically identical in construction and are of a form long used in machines of this type. Each hopper is provided with two pickers 12 (Fig. 2) on picker slides 13 which are reciprocated to right and left (Fig. 2) in the base casting 14 of the hopper by means of a gear sector 15 on an oscillating shaft 16.

When the picker shaft 16 is actuated in a clockwise direction by well known mechanism, the picker slides 13 and pickers 12 are thrust to the right (Fig. 2) to eject from the hopper R or P (Fig. 3) the lowermost card of the stack through a suitable discharge opening. The ejected card is gripped by a pair of feed rollers 17 and transported to the right (Fig. 2) past a sensing station at which are located a contact roller CR and the first set of reproducing brushes RB1. These brushes reach through the holes in the card which represent data and make contact with the contact roller CR at different times in the machine cycle, depending upon the distance of a hole from the left hand edge of the card (Fig. 2).

In this machine, the cards are fed face down with the top edge (the right hand edge, Fig. 2) leading, as explained in the foregoing patent. Before passing the reproducing brushes RB1, the card passes what is commonly known as an X-brush which, on the reproducing side of the machine is designated RXB (Fig. 2). From the contact roller CR and the brushes RB1, the card is advanced further to the right past a second set of reproducing brushes which make a second analysis of the card and which are ordinarily used in conjunction with other brushes presently to be mentioned, to verify the fact that the cards on the punch side of the machine are identical with cards on the reproducing side of the machine. Fig. 2 shows part of the reproducing side and Fig. 3 the punching side of the machine.

In Fig. 3, the cards to be punched, which are designated 11, are similarly fed to a pair of feed rollers 18 past the punch X-brush PXB to the punches 19 and then on transported to the right by feed rollers 20 past the punch station at which are the punch brushes PB and the punch contact roller PCR. After the cards pass the brushes PB and the contact roller PCR, another set of rollers 21 carry the punched cards into the punch receiving pocket PRP (Fig. 1). On the reproducing side of the machine, a set of feed rollers similar to the feed rollers 21 transport the reproducing cards 10 into the reproducing receiving pocket RRP.

The brushes RXB, PXB and the brushes RB1 and the punches 19 are, respectively, located in approximately the same relative positions whereby a card fed from the hopper R and a card fed from the hopper P are driven in step first past the brushes RXB, PXB, then past the brushes PB1 and the punches 19. During this period, the designations in the cards 10 will control mechanism which operates the punches 19 under control of the punch magnets PM (in Fig. 3) to cause holes to be punched in the cards 11 to correspond with holes punched in the cards 10.

The manner in which the punches are operated under control of the magnets PM is fully explained in the above patent and, since it is not involved herein, no further description will be given of the mechanism for operating the punches.

On the reproducing side of the machine, the usual back plate for the hopper R which ordinarily consists of a solid cast plate illustrated in Fig. 3 and identified by the reference numeral 22, is replaced by a vacuum chamber 23 (Fig. 2) having a straight side wall 23a to guide the right hand edges of the cards vertically in the hopper R. The chamber 23 extends the full length and height of the hopper R between the side plates 24, which form part of the main frame work of the machine, and in cross section taper downwardly to form a flattened and slightly curved nozzle 23b underneath which every card ejected from the hopper R by the pickets 12 must pass, the nozzle 23b just barely clearing the surface of the card as it leaves the hopper. The base plate 14 consists of a hollow casting having a vacuum chamber 14a provided with a long slot 14b to form a nozzle over which the face of the card ejected from the hopper passes. The nozzles 14b and 23b are spaced to form a narrow slot or throat through which the ejected card must pass.

It is evident, that if a strong vacuum is created in the chambers 14a and 23 any particles of lint, dust or dirt or other foreign matter attached to or partly embedded in the surface of the card will be removed from the card as it passes the nozzles 14b, 23b, before the card reaches the brushes RXB and RB1.

The punches 19 (Figs. 3 and 6) are guided in two cross bars 25, 26 which are mounted between the side plates 27 (Fig. 3) of the punching unit which plates also support the punch controlling magnets PM and other mechanism associated with the punches 19. The punches are guided by means of a top guide plate 28 and a lower guide plate 29 secured to the faces of the bars 25, 26 respectively. There is also provided a stripper plate 30, the function of which is to strip the card from the punches 19 when the latter are withdrawn.

After the cards pass the punches 19, they pass underneath a nozzle 31 (Figs. 3 and 6) having a long slot 31a close to the surface of the cards as they pass from the punches 19 to the punch brushes PB. This nozzle extends crosswise of the machine between the plates 27 and is secured to the ends of the bar 26 by means of screws 32. The nozzle 31 is formed at the left hand end of a long narrow vacuum chamber or duct 31b which is secured to the lower edges of the plates 27.

Figure 5:
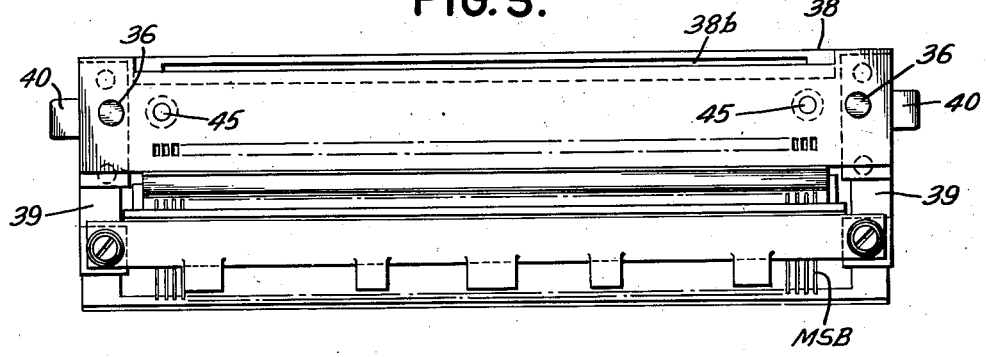
Fig. 5 is a plan view of the removable punch die structure.
Figure 4:
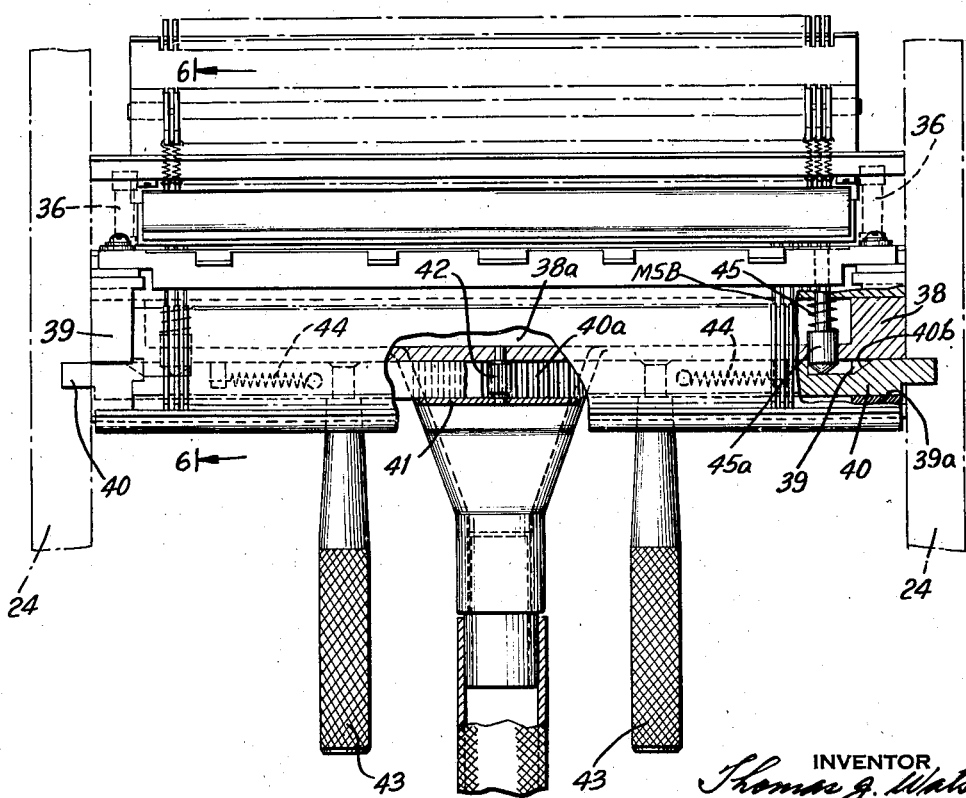
Fig. 4 is a vertical section on the line 4—4 in Fig. 3.

The die is designated 33 in Fig. 6 and with a plate 34 which guides the punches after they have passed the die 33, forms part of a removable die structure. The die 33 and plate 34 are secured to the top surface of a bar 35 which has a suitable opening 35a through which the punchings may fall. This bar 35 is provided with aligning pins 36 (Figs. 4 and 5) at each end which enter holes in the bar 26 to align the openings in the die 33 with the punches 19 when the die structure is inserted in the machine.

Secured to the bar 35 by means of common long screws 37, as best shown in Fig. 6, is a trough shaped casting 38 and end support blocks 39 which are located at the ends of the bar 35 and casting 38. The trough shaped casting 38 is arranged to form a vacuum chamber 38a with the bar 35 and the casting 38 and bar 35 are so shaped as to form a nozzle 38b over which passes each card while it is being perforated by the punches 19.

The blocks 39 are provided with rectangular open slots 39a (Figs. 4, 5 and 6) guiding the outer ends of bolts 40, the inner ends of which are guided by a strap 41 secured to the casting 38. The bolts are provided with rack teeth 40a meshing with a pinion 42 which is rotatably supported by the strap 41 and by the casting 38. The bolts 40 are also provided with downwardly extending handles 43 close enough together so that the fingers of one hand may grasp both bolts and, by squeezing them toward each other, withdraw the outer ends of the bolts from suitable sockets in the plates 24. Normally the bolts 40 are spring urged into the sockets in the plates 24 by means of springs 44 which are connected to pins carried by the bolts and to pins on the casting 38. The pinion 42 is an equalizing means for causing the bolts to be withdrawn together regardless of the amount of pressure exerted on the handles 43.

In order to force the die structure downwardly when it is to be removed, there is provided a pair of extractor pins 45 (Figs. 4, 5, and 6) which are spring urged downwardly by springs 46 interposed between the cross bar 35 and the enlarged heads 45a of the extractor pins. The heads 45a may be conical or rounded at their lower ends and normally rest upon the flat surfaces or dwells of cams 40b in the bolts 40. When the bolts are fully withdrawn, the cams 40b engage the heads 45a of the extractor pins and push them upwardly against the stripper plate 30 to thereby force the bar 35 and the die structure downwardly to dislodge the aligning pins 36 from their rather close fitting holes to enable easy withdrawal of the die structure from the machine.

The chambers 14a, 23 and 38a and the duct 31b are connected to a suction unit generally designated 47 (Fig. 1) driven by a motor M. This unit includes a dust separator 48 and a dust collecting chamber 49. The piping system comprises a main manifold 50 connected to the separator 48 by means of the manifold connection 51 thereon. The manifold 50 has a long branch 50a connected to the chambers 14a and 23 by means of short lengths of pipe 52 (see Fig. 2 also), the chamber 23 being provided with a short nipple 23c for the purpose, whereas the casting 14 has a suitable hole to receive one of the pipes 52. Since the die structure is removable, the casting 38 (Fig. 3) is formed with a down spout 38c, the lower end of which receives a nipple 53 over which is pressed a length of hose 54 connected to a short extension of the manifold 50 (Fig. 1). A length of pipe 55 connects the manifold 50 with the duct 31b.

It will be seen from the foregoing that all of the cards passed through the machine are subjected to a thorough cleaning on both sides thereof in the course of their passage from the hoppers R and P to the punches RRP and PRP, respectively, and that this cleaning takes place prior to the passage of the cards past the sensing brushes.

The machine disclosed in the above patent is sometimes constructed so as to perforate record cards under the control of designations in the form of conductive marks. This machine is known in the art as the "International Mark Sensing Reproducer" and is disclosed in Patent No. 2,275,396. The present invention may be usefully employed in this latter machine by equipping the machine with suitable sensing brushes which sense the conductive marks in the different index-point positions of the card columns just prior to the arrival of such index-point positions at the punches 19. In this type of machine, usually three columns of a standard record card are devoted to the reception of each conductive mark which represents a digit of numerical data, and three brushes are provided, one for each column, of which the middle brush is usually common.

Since the circuit control through these brushes is somewhat delicate owing to the high resistance of the conductive marks, it may be desirable to clean the card before it passes the mark sensing brushes. These brushes are designated MSB (in Figs. 3 to 6) and are mounted in a well known way in a brush bar 56 supported by the blocks 39. The ends of the brushes MSB are guided by a slotted comb 57 (best shown in Fig. 6) through which the ends of the brushes reach and engage a bar 58 of insulating material which is secured to the framework carrying the punches 19. When a machine is so equipped, the usual cast back plate 22 for the magazine, may be replaced by a suction chamber similar to the chamber 23, and the bottom plate for the punch magazine may be replaced with one similar to the bottom plate 14 in Fig. 2. This will have the advantage in that the card will be thoroughly cleaned before it passes the punch X-brush PXB.

While there have been shown and described and pointed out the fundamental novel features of the invention as applied to a single embodiment, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a record controlled perforating machine, a perforating station, a record sensing station, means to transport records from said perforating station to said sensing station; and means between said stations and located on opposite sides of the path of said records for removing dust, lint, and other undesirable matter clinging to the faces of the records.

2. In a record controlled machine, a record sensing station, means to feed records having designations to said station; and means cooperating with both faces of each record fed for removing from said faces dust, lint, and other foreign matter before said records reach the sensing station.

3. In a record controlled machine, a row of record perforating punches, a row of electrical sensing brushes for controlling said punches for sensing perforations made by said punches, means to transport records from said punches to said brushes; and means including vacuum nozzles cooperating with the faces of said records between said punches and said brushes for removing dust, lint, and other foreign matter from said records prior to arrival at said brushes.

4. In a record controlled machine having a record receiving magazine provided with a discharge opening through which the records are ejected; and means at said opening for removing from the faces of the records dust, lint, and other objectionable foreign matter.

5. In a record controlled machine, a magazine having one wall thereof formed as a nozzle and having the bottom thereof similarly formed as a nozzle confronting the first nozzle to provide a narrow throat through which records ejected from the magazine must pass; and means for creating a vacuum in said nozzle to remove from the faces of a card ejected from the magazine dust, lint, and other foreign matter clinging to the card.

6. In a record controlled machine, the combination of a record sensing station having sensing means arranged to sweep across the face of a record fed thereto, a record magazine having a discharge opening formed with a nozzle confronting the face which is traversed by the sensing means, and means to eject records from said magazine and convey said records to said sensing means.

7. In a record controlled machine; a record receiving magazine having one wall thereof formed as a vacuum chamber and shaped along one edge as a nozzle and having a bottom provided with a vacuum chamber shaped to form a second nozzle spaced from the first nozzle to form a throat through which records ejected from the magazine must pass; and means to create a vacuum in said chambers to thereby through said nozzle remove from the faces of the records discharged from the magazine, dust, lint, and other foreign matter while the record is being ejected from the magazine.

8. In a record controlled perforating machine, cooperating punches and die disposed on opposite sides of a feed path for records and including main support members, one of which supports the die and is provided with openings to pass punchings from the die; a vacuum chamber secured to said last named support and arranged to form with said support a nozzle cooperating with one face of a record passed in front of the die to remove dust, lint, and other foreign matter from said face, said chamber also communicating with said opening in said support to remove the punchings from said die; and means to produce a vacuum in said chamber including a separator for separating punchings and foreign matter from the air drawn through said nozzle and the openings in the die.

9. In a record controlled perforating mechanism, a row of punches, fixed means to support and guide said punches in said machine, a nozzle secured thereto and arranged to traverse that face of a record passed underneath the punches which confronts the punches, a die cooperating with said punches, a vacuum chamber, a support for said die and vacuum chamber, said die and said support being shaped to form a second nozzle confronting the other face of the record, and means to induce vacuum in said chamber and the first nozzle to remove from both faces of the record dust, lint, and other foreign particles clinging to said record.

10. In a record controlled perforating machine, perforating means including a row of punches and cooperating die and means for operating the punches, a support for said die; and a vacuum chamber consisting of a trough-shaped element partially surrounding said support, said support and said trough-shaped element being shaped to form a nozzle cooperating with one face of a record perforated by said mechanism to remove from said face dust, lint, and other foreign particles clinging to said record.

11. In a record controlled perforating machine, a row of punches, a die cooperating with said punches, a die support; a vacuum chamber casing attached to and partially surrounding said support to form a vacuum chamber, said support having an opening between the openings in the die and said casing for passing the punchings from said die to said casing, said casing and said support being shaped to form a nozzle confronting the face of a record contacting the die to remove from said face, dust, lint and other particles clinging to the record; and means to induce a vacuum in said chamber including a dust separator and conduit for conveying said dust, lint, and punchings to said separator.

THOMAS J. WATSON.